US006885932B2

(12) United States Patent
Liu et al.

(10) Patent No.: US 6,885,932 B2
(45) Date of Patent: Apr. 26, 2005

(54) MISFIRE DETECTION IN AN INTERNAL COMBUSTION ENGINE

(75) Inventors: Louis Yizhang Liu, Troy, MI (US); Richard J. Gilbert, Livonia, MI (US); Donald P. Kultgen, Livonia, MI (US); Jeffrey D. Naber, Dearborn, MI (US); Hanlong Yang, Northville, MI (US)

(73) Assignee: Motorola, Inc., Schaumburg, IL (US)

( * ) Notice: Subject to any disclaimer, the term of this patent is extended or adjusted under 35 U.S.C. 154(b) by 59 days.

(21) Appl. No.: 10/637,121

(22) Filed: Aug. 8, 2003

(65) Prior Publication Data

US 2005/0033501 A1 Feb. 10, 2005

(51) Int. Cl.$^7$ .......................... G05D 1/00; G06F 17/00; B60T 7/12
(52) U.S. Cl. ...................... 701/103; 701/104; 701/111; 701/114; 73/116; 73/118.1; 73/117.2; 73/117.3; 123/480; 123/364; 123/357; 123/406.27; 123/406.62
(58) Field of Search ............................... 701/103, 104, 701/111, 114; 123/179.17, 480, 445, 357, 364, 406.14, 406.16, 406.27, 406.29, 406.58, 406.62; 73/116, 117.2, 117.3, 118.1

(56) References Cited

U.S. PATENT DOCUMENTS

| 5,278,760 A | 1/1994 | Ribbens et al. |
|---|---|---|
| 5,377,537 A | 1/1995 | James |
| 5,387,253 A | 2/1995 | Remboski, Jr. et al. |
| 5,503,007 A | 4/1996 | Plee et al. |
| 5,508,927 A | 4/1996 | Remboski, Jr. et al. |
| 5,515,720 A | 5/1996 | Remboski, Jr. et al. |
| 5,542,291 A | 8/1996 | James |
| 5,544,521 A | 8/1996 | McCombie |
| 5,559,705 A | 9/1996 | McClish et al. |
| 5,574,217 A | 11/1996 | McCombie |
| 5,602,331 A | 2/1997 | Prevost |
| 5,633,456 A | 5/1997 | Stander |
| 5,713,339 A * | 2/1998 | Kishida et al. ............. 123/676 |
| 5,804,711 A * | 9/1998 | Remboski et al. ......... 73/117.2 |
| 5,841,025 A | 11/1998 | Remboski et al. |
| 5,862,506 A | 1/1999 | Lynch et al. |
| 5,906,652 A | 5/1999 | Remboski et al. |
| 6,112,149 A | 8/2000 | Varady et al. |
| 6,388,444 B1 | 5/2002 | Hahn et al. |

OTHER PUBLICATIONS

Plapp, G. et al. "Methods of On–Board Misfire Detection." SAE Paper 900232, 1990.

* cited by examiner

Primary Examiner—Willis R. Wolfe
Assistant Examiner—Johnny H. Hoang
(74) Attorney, Agent, or Firm—Brian M. Mancini

(57) ABSTRACT

A method and system for a misfire detection acquires (301) a series of acceleration data (302) representative of acceleration behavior of an engine. The data is sampled (304) to obtain acceleration data samples at a rate sufficient to obtain up to fourth-order perturbations of the data. The samples are filtered (322) to provide bandwidth limited samples, which are provided to at least two channels (325, 329). The samples are pattern matched (332) in a first channel to enhance harmonic phenomena and pattern canceled (330) in a second channel to enhance random phenomena. Hard and random misfires are detected (334) dependent on a magnitude of the filtered acceleration data samples. Preferably, a third channel (335) is added to detect multiple misfires.

22 Claims, 5 Drawing Sheets

FIG. 5
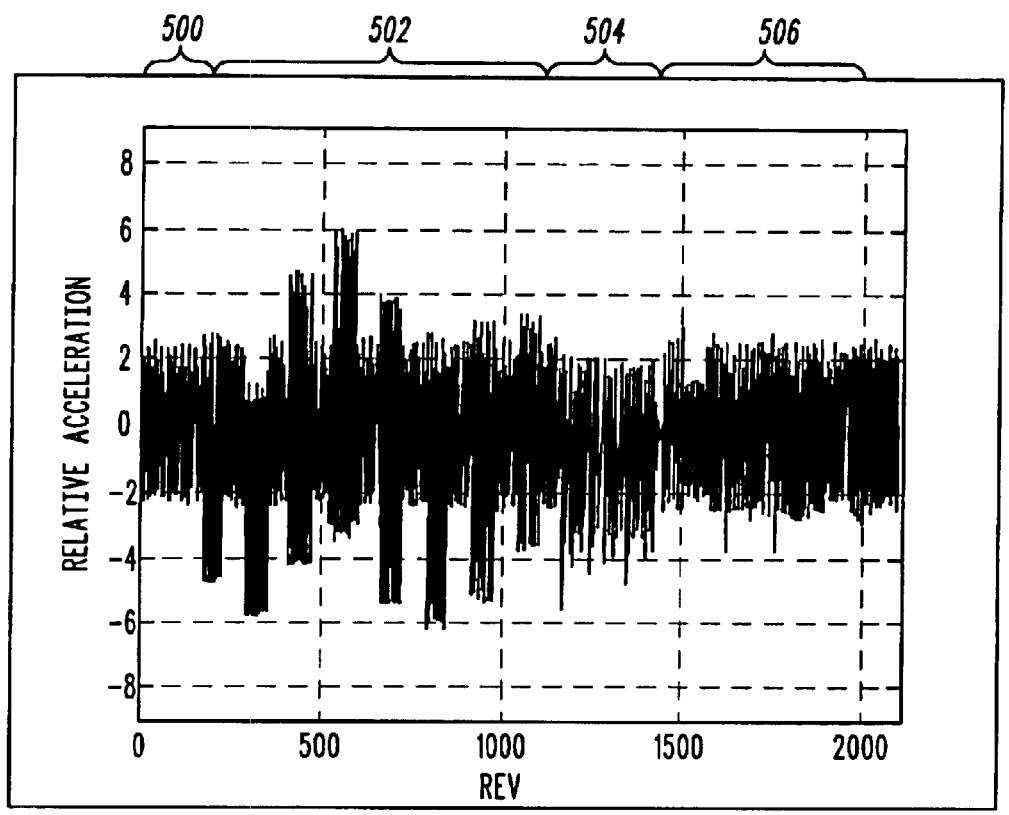
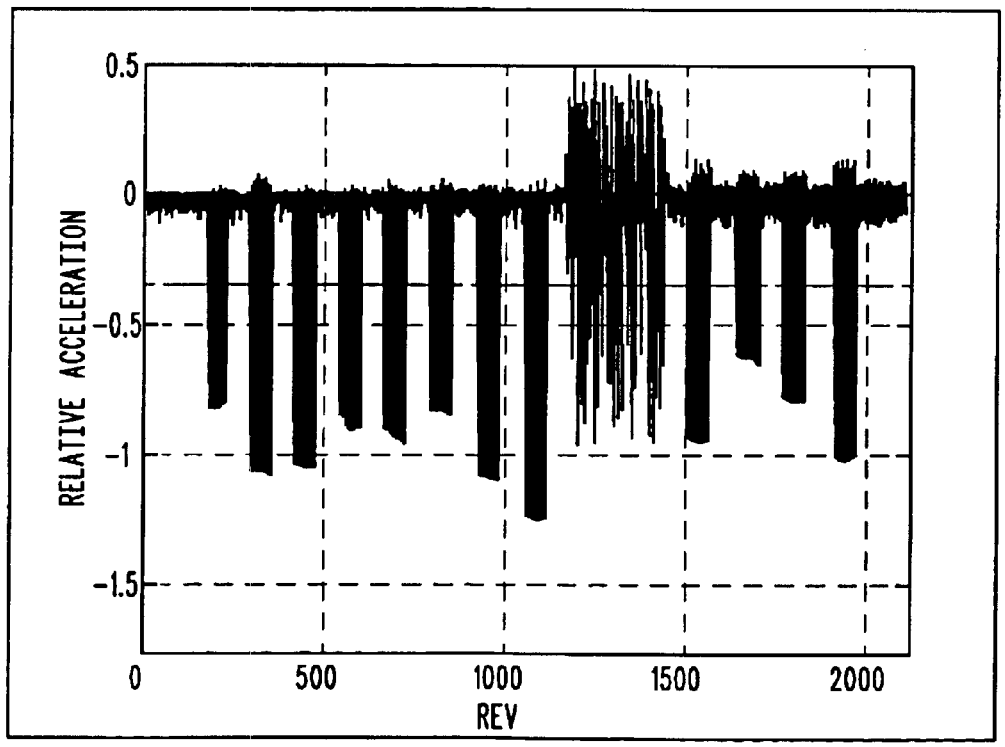
FIG. 6

MISFIRE DETECTION IN AN INTERNAL COMBUSTION ENGINE

FIELD OF THE INVENTION

This invention is generally directed to the field of internal combustion engine controls, and specifically to a signal processing system and method for a reciprocating engine misfire detection system.

BACKGROUND OF THE INVENTION

Many contemporary engine controls have integral misfire detection systems. A misfire in an engine will lower efficiency and raise emissions due to poor combustion. With ever-increasingly more stringent legislated emissions standards, the assurance of accurate and complete misfire detection under all engine and vehicular operating conditions is becoming mandatory. In particular, the industry has set next generation standards for On-board Diagnosis (OBDII) for detection of engine misfire. These new standards will require that many different types of misfires must be detected up to engine redline.

Commonly, system designers rely on measurement of engine acceleration, dependent largely on engine torque produced (or not produced) during a combustion process to determine misfiring of a particular engine cylinder. Given the acceleration information, misfires are predicted by various signature analysis, and/or spectral analysis, methods.

As a practical matter, an engine's acceleration behavior is also affected by powertrain related behaviors other than firing torque. These other behaviors can significantly reduce fidelity or signal-to-noise ratio (SNR) of the primarily firing torque related acceleration signal under analysis. Furthermore, under some engine operating conditions, the noise exceeds the primarily engine torque related acceleration signal under analysis. Moreover, the noise related behavior is not limited to only engine operation causes, but include behaviors related to the complete driveline. Some noise related behaviors that are detrimental include relatively low frequency, or firing rate, driveline resonance effects, or vibrations, excited at least partially by cylinder misfiring, torque converter lockup, low speed lugging behavior characteristic of a manual transmission, a change in transmission gears, rough road conditions, etc. Each of these sources of stimulus excite the driveline to perturbate, or transiently oscillate, at a resonant frequency or harmonic thereof. Other noise related behaviors that are detrimental are of a higher frequency, such as occurs when an engine operates at a high engine speed, under fueled conditions, and under various loading, which can all mask engine misfires. These sources of noise may be random in nature.

When the above-mentioned behaviors manifest themselves a significant measure of what amounts to noise, relative to the misfire induced behavior, is introduced into the acceleration measurement. This noise can largely swamp out any signatory behavior of a misfire event.

FIG. 1 shows a first portion 101 of a noise-free waveform indicative of an acceleration signal derived from an engine's crankshaft due to a properly firing cylinder, firing in a sequence of several cylinders, and a second portion 103 of the waveform indicative of acceleration of an engine's crankshaft due to a misfiring cylinder later in the sequence of firing cylinders. At reference number 103 the engine's crankshaft grossly decelerates because proper firing did not occur. Given this observation of acceleration behavior, a magnitude comparison process can monitor the engine's acceleration behavior at a predetermined threshold 105 and indicate a misfiring condition if the acceleration signal transitions below the threshold 105.

FIG. 2 illustrates a behavior of an actual acceleration signal 201 derived from a running engine over about one-hundred fifty cylinder combustion cycles. This acceleration signal 201 includes a repetitively induced misfire by periodically removing a spark signal from one cylinder. From FIG. 2 it can be seen that in a real-world application, the signal derived from a running engine is affected by causes other than combustion related torque as asserted earlier. For reference purposes, the reference markers associated with the horizontal axis 203 demarcate the repetitively induced occurrences of misfire. The waveform 201 is derived using an acceleration sensing device coupled to the engine's crankshaft. Because of crankshaft torsional vibrations, inertial torque due to reciprocating masses, driveline resonance effects, and other mechanically induced vibrations on the engine's crankshaft, the waveform shown in FIG. 2 has relatively poor fidelity. Not only are there the harmonic effects due to the periodic misfire there are also random events which essentially produce noise. The situation further deteriorates at higher engine speeds and during different engine fueling and/or loading conditions. These different conditions make detection of misfire by a simple threshold detection scheme substantially hopeless.

Some misfire determination schemes use running average filters and/or mean or median filters to eliminate low frequency behavior—such as driveline vibration behavior in an acceleration signal. Running average filters are somewhat adequate for smoothing random non-impulsive perturbations in the incoming signal but tend to smear sharp monotonic edge transitions that occur due to driveline inputs, whereas median filters tend to preserve the sharp driveline edge transitions while rejecting impulsive inputs (e.g., misfire acceleration behavior) but are more influenced by non-impulsive variations. Moreover, these techniques do not address severe torsional oscillations or noise due to high speed conditions, fueled conditions, different loading conditions, multiple misfires per engine combustion cycle, etc.

What is needed is an improved approach for misfire detection that can detect a broad range of misfire patterns, particularly one that is insensitive to adverse powertrain operating effects. In particular, an improved system needs to account for driveline perturbations over a wide range of engine operating conditions including operation up to an engine speed redline. This improved technique also needs to improve acceleration signal fidelity by improving the acceleration signal's signal-to-noise ratio in order to accurately detect misfire. The improved technique ideally would detect both periodic, random misfires, and multiple misfires per engine combustion cycle in an acceleration signal with high fidelity.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

FIG. 5 is a graph showing various test misfire signals and noise unprocessed by the inventive structure; and FIG. 6 is a graph showing both the improved signal-to-noise ratio of the same acceleration data that has been processed through the inventive structure.

DETAILED DESCRIPTION OF THE PREFERRED EMBODIMENT

The present invention provides a method and system with improved misfire detection that can detect a broad range of misfire patterns. In particular, the present invention accounts for driveline perturbations over a wide range of engine operating conditions including operation up to an engine speed redline. Further, the present invention detects both periodic and random misfires with higher acceleration signal fidelity by improving the acceleration signal's signal-to-noise ratio in order to accurately detect misfire.

Figure 1:
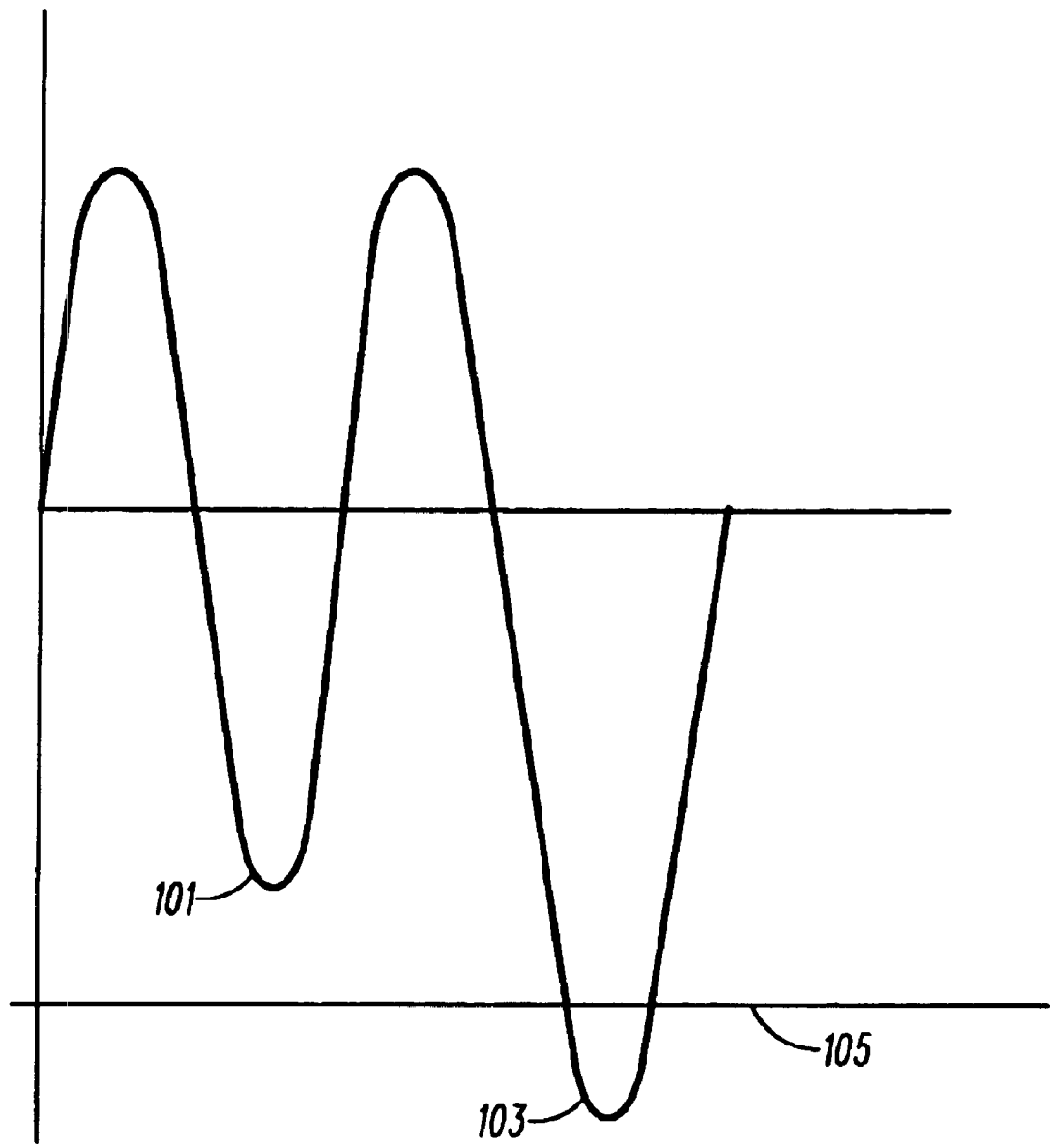
FIG. 1 is a chart showing a theoretical acceleration waveform representing engine torque and illustrates the behavior of proper firing and misfiring.
Figure 2:
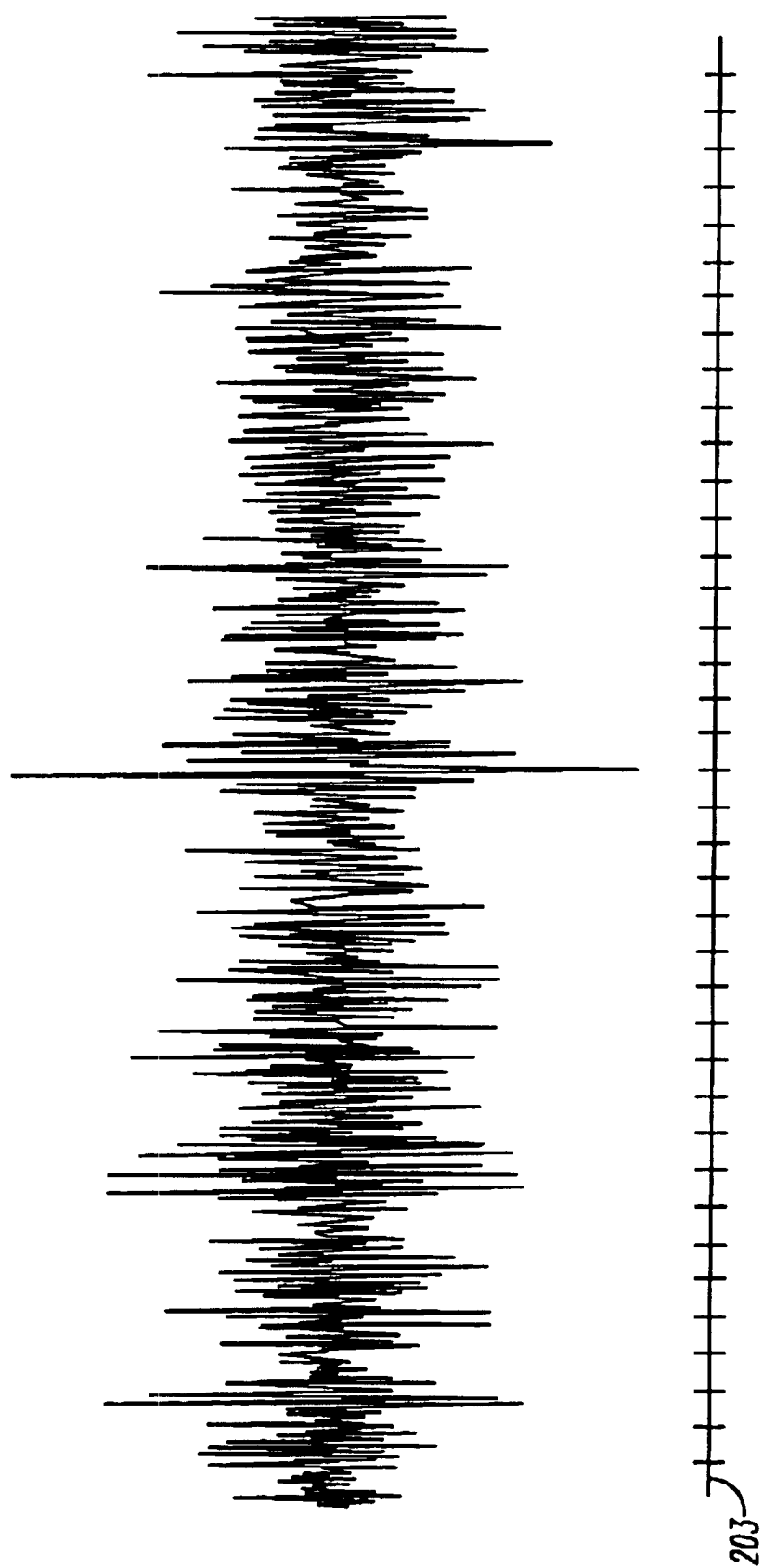
FIG. 2 is a chart showing an engine acceleration waveform from an actual engine running at 5,000 RPM under a light load illustrating effects of high frequency noise due to crankshaft torsional vibrations, inertial torque due to reciprocating masses, other mechanically induced vibrations on the engine's crankshaft, and driveline perturbations.
Figure 3:
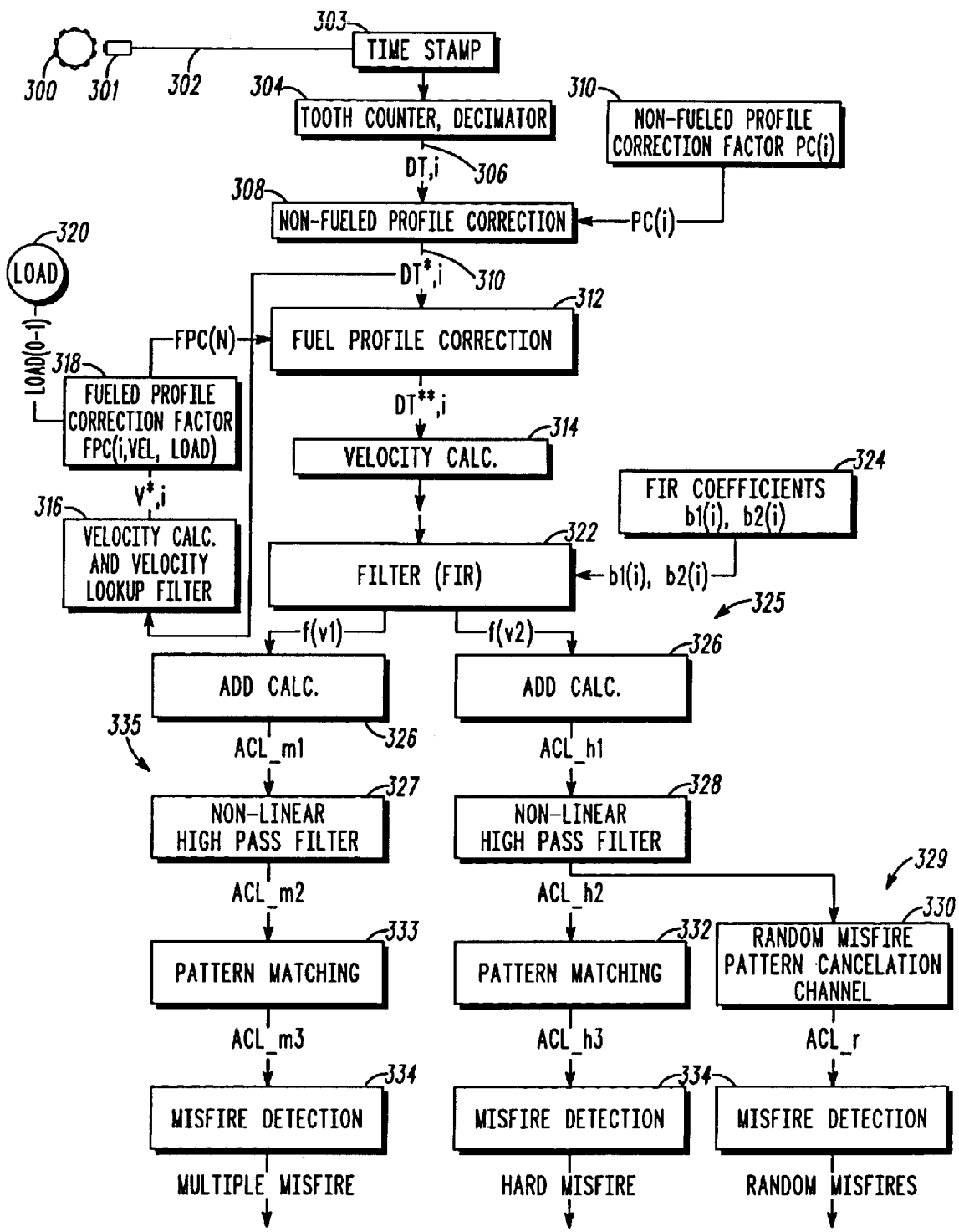
FIG. 3 is a system block diagram in accordance with a preferred embodiment of the invention.

FIG. 3 is a system block diagram in accordance with the present invention. A wheel 300 has teeth, or positional markers disposed radially on an edge of the wheel 300. The wheel 300 is mechanically coupled to, and driven by, the reciprocating internal combustion engine. For example, the toothed wheel may be couple to the front of a crankshaft of the engine. An encoder, or position sensor 301, is positioned across from the wheel 300 and is used to sense position of the teeth as the wheel rotates driven by the engine's combustion process. A variable reluctance sensor 301 (or any other type of comparable sensor, such as Hall Effect sensor) can be used as the sensor 301 to provide a signal 302 indicating a timing of the passage of a tooth by the sensor. The time stamp of each tooth count of the signal 302 is used to interpreted the acceleration behavior of the reciprocating engine, as is known in the art. Note that the system is a sampled data system but could be implemented in a time-continuous domain if desirable. In the present invention a wheel 300 with thirty-five teeth is used with a missing tooth where the thirty-sixth tooth would be. It should be noted that a wheel with other tooth configurations can also be used.

There are many well-known techniques for determining an absolute position of an engine. Here, the sensor 301 is coupled to the toothed wheel driven by the crankshaft of the reciprocating engine. There are thirty-five teeth (with missing thirty-sixth tooth for detecting top-dead-center) on the toothed wheel causing a pulse to be output from the sensor every ten degrees of engine rotation. In a four-stroke reciprocating engine seven hundred and twenty degrees of crankshaft revolution constitutes one complete engine cycle, which is the primary period of interest for misfire analysis.

Figure 4:
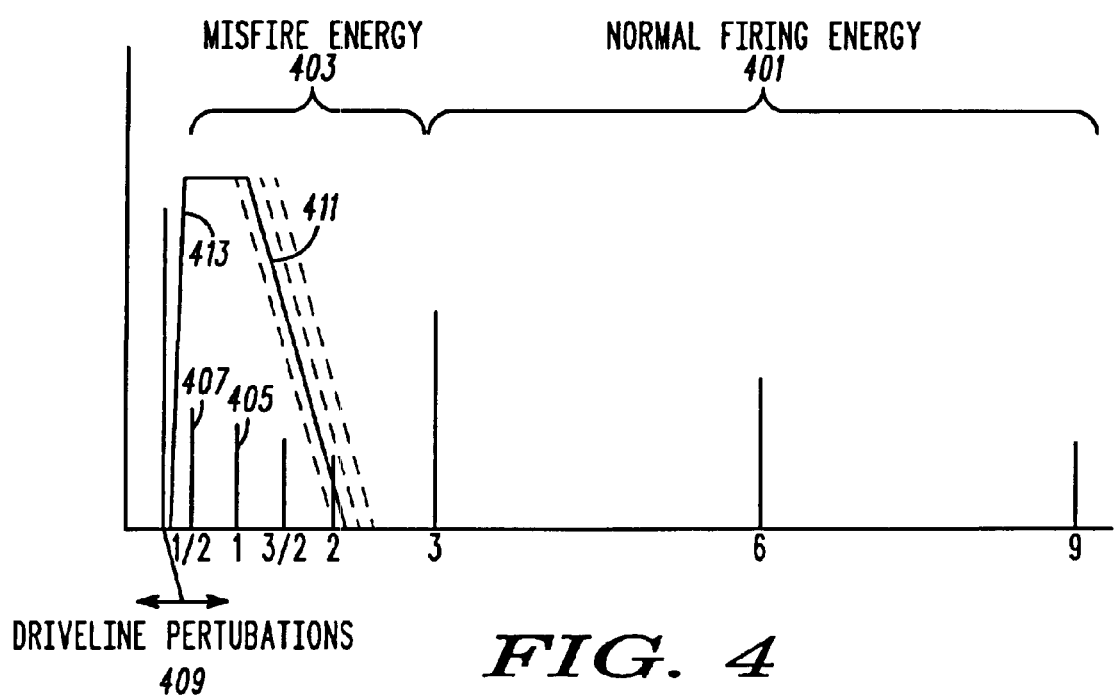
FIG. 4 is a chart illustrating various spectral behavior characteristics of engine acceleration due to normal combustion torque, torque due to reciprocating masses, misfiring, torsional vibrations, high-order subpartials, and driveline vibrations for a 6 cylinder 4-stroke reciprocating engine in terms of cycles/engine revolution, or order.

FIG. 4 is a chart illustrating various spectral behavior characteristic of engine acceleration due to normal combustion torque, torque due to reciprocating masses, misfiring, torsional vibrations, high-order subpartials, and driveline vibrations for a six cylinder four-stroke reciprocating engine in terms of cycles/engine revolution or order. Normal combustion firing torque (measured here as energy), and torque due to reciprocating masses 401 manifests itself at 3, 6, and 9 cycles/revolution. Misfire induced energy 403 includes energy indicative of one misfire per revolution 405 (since three of six cylinders normally fire per revolution), and a single cylinder (hard) failure of one cylinder at one-half cycle per revolution 407 (since each cylinder normally fires every two revolutions). Driveline vibrations 409, at least partially caused by cylinder misfiring, torque converter lockup, low speed lugging behavior characteristic of a manual transmission, a change in transmission gears and rough road conditions, occur at a characteristically low order, are relatively strong in magnitude, shift around in order, and are positioned precariously proximate the energy associated with misfire.

In particular, it is the first order (one cycle/revolution) and half-order (one-half cycle/revolution) behavior that is precariously proximate the order of the driveline vibrations that make it difficult at best to determine a misfiring condition in a reciprocating engine. Furthermore, through experimentation, it has been found that the behavior of these closely proximate sources of behavior varies significantly in order due to driveline vibrations and magnitude due to driveline vibrations and various engine operating conditions including engine speed, engine load, and engine-transmission coupling compliancy. To improve the fidelity of the acceleration waveform shown, a system and corresponding method will be detailed below.

Referring back to FIG. 3, the output 302 from the sensor 301 is sampled by a data sampler 303 that obtains timestamps from the sensor output. The engine position acquisition apparatus 304 uses these timestamps to output a timing period, delta time, of selected teeth. The apparatus 304 decimates the tooth timestamp signal to a desired number of data samples per engine cycle. Specifically, a delta time measurement, DT, is provided between the edges of the decimated tooth samples (i). Ideally, DT will be constant for all samples at constant engine speed. However, misfires will alter this.

The samples 306 are then processed using a non-fueled profile correction 308, as is known in the art. This correction 308 compensates for manufacturing defects and tolerances in the teeth of the wheel 300 and their detection by the sensor 301. This correction can be provided by a predefined non-fueled profile correction factor, PC(i), 310 or can be learned during operation. The non-fueled corrected delta time measurements 310, DT*, are then output for each sample (i).

In accordance with one embodiment of the present invention, a fueled profile correction 312 is then applied. It should be recognized that this correction can be applied anywhere in the block diagram of FIG. 3. As shown this correction optimizes performance. The fueled profile correction corrects for torsional oscillations (harmonics) of the driveline, which is a problem at high speeds since these oscillations may have a magnitude greater than the magnitude of misfires, making the misfires difficult to be detected accurately. In particular, the delta time (DT*) is modified by a multiplier (fpc) that is speed (n), load (torque), and tooth number (i) dependent, as follows:

$$DT^{**}_i = fpc(i, n, \text{load}) \cdot DT^*_i$$

The multiplier can be predefined or can be learned during normal non-misfire operation. For example, the multiplier can be pre-stored in a table during calibration with fixed values. On the other hand, the multiplier can be adapted during vehicle operation (variable). The multiplier is interpolated with respect to speed and load for the ih sample and applied as above (where in application speed and load are fixed for a give cycle of data). Engine speed for the lookup table 318 input is determined internally using a velocity calculation 316 from the provided samples (i.e. v=1/DT*) with an input filter and hysteresis. Engine load 320 is an input parameter to the multiplier and is best scaled (0–1) as expected torque for a given normal firing cycle.

The fueled-profile correction is bandwidth limited (shown as 411 in FIG. 4) for torsion and other crankshaft vibrations. This bandwidth limiting is performed offline in calibration, and is used to advantage since the fueled-profile correction is only used to correct orders of concern in misfire detection, i.e. not more than $2^{nd}$ order. More specifically, the multiplier is determined from fueled data (i.e. normal engine operation without misfire), but very importantly is bandwidth limited by a bandpass filter to remove signals that are not of interest to misfire detection, such as orders greater than $2^{nd}$ order. Without this bandwidth limiting, the multiplier can actually result in errors during the speed/load interpolation resulting in decreased detection capability or false misfire detection. Moreover, the multiplier is more linear for better interpolation and more robust by applying only the bandwidth limited signal. Advantageously, the multiplier can be calculated non-real time (i.e. with a delay).

The corrected velocity is then determined in a velocity calculation 314 from the provided samples (i.e. v=1/DT) and is then filtered by a linear finite-impulse-response (FIR) filter 322. This filter 322 is a programmable digital filter programmed through a priori engine characterization and/or adaptively as the engine runs and is of a higher order than normally encountered for improved out-of-band signal detection. In particular, after the velocity calculation ($v_i$=1/DT$_i$) the signal is linearly filtered as follows $$v'(i)=b(1)*v(i)+b(2)*v(i-1)+ \ldots +b(n+1)*v(i-n)$$

where i is the current velocity index, n is the FIR order. The FIR coefficients 324 are determined empirically and can be predefined or can be learned and adapted during operation of the engine. Beneficially, the FIR filter retains the phase of the orders. Moreover, the FIR filter can be used in combination with a non-linear filter and pattern-matching used in hard misfire-channel and pattern-cancellation used in the random channel as will be described later.

Significant noise signals exist in orders close to the 0.5th order. It should be noted that the 0.5 order is very significant as it represents a hard misfire, a very important order to detect. Therefore, orders lower than 0.5 should be attenuated to detect hard misfires, particularly at high engine speeds and low loads. The present invention solves this problem by using an increased FIR order and configuring the filter as a bandpass, instead of just a low pass. This is also important when considering the DC component, which is present in the prior art but reduced in the present invention. With the addition of a highpass non-linear filter (with additional attenuation of the orders below 0.5), along with a specific pattern match block (attenuation of the non-harmonics) and application of the FIR in this manner, misfire detection is significantly improved through the combination of blocks of the diagram of FIG. 3, and as will be explained below.

At a next block 326 the filtered velocities, f(v), are used to determine acceleration. The present invention uses a novel acceleration calculation to remove non-linearities observed in its use and improve high frequency noise rejection. The acceleration is calculated using a central difference (where the error is of magnitude $DT^2$) of the velocity, as follows:

$$\text{Acceleration } v_{i+1}-v_{i-1}$$

Prior art calculations used a first order (error is of magnitude DT) acceleration calculation of:

$$\text{Acceleration}=dv/dt=d\theta/dt \cdot dv/d\theta=v_i \cdot (v_i-v_{i-1})$$

Simple harmonic signal analysis shows that with v approximated as a sine or cosine series (which is a quite good approximation to misfire signals that have been filtered with the FIR in the previous block 322) that harmonics are generated with the prior art acceleration calculation because of the v·v terms. If the DC value of the signal is large, this introduces only small harmonics. However, with a bandpass FIR the DC value is significantly reduced and thus harmonics become more significant. In either case, these harmonics are not wanted. The use of the central difference algorithm of the present invention without the velocity multiplier eliminates the creation of harmonics. The result is still an acceleration but is $dv/d\theta$ instead of $dv/dt$. Advantageously, the central difference algorithm also provides additional attenuation of the signal at high frequencies (3 dB at 0.6 Nyquest), because of the differencing across two samples instead of one sample. These high frequencies are well above the frequencies of interest in misfire detection when using the high sample rate processing of the present invention, and thus the central difference algorithm improves SNR.

The acceleration samples (ACL_h1) are then processed through a special non-linear highpass filter 328. The highpass filter accentuates the lower slope (previously shown as reference number 413 in FIG. 4) of the bandpass FIR filter 322 to enhance rejection of driveline perturbations (previously shown at reference number 409 in FIG. 4). This filter 328 is a programmable digital filter programmed through a priori engine characterization and/or adaptively as the engine runs. The configuration of the non-linear filter used herein shall be referred to as a Shifted Time-Weighted Trimmed-Mean (STWTM) filter.

Ordinarily, Time Weighted Trimmed-Mean filtering can be implemented by first sorting the queue of length N and throwing out samples 1 through (N-M)/2 and samples ((N+M)/2+1) through N. Of these results, the M values are taken and averaged. The final step is to subtract this average value from the input data.

However, in the STWTM implementation of the present invention, it is not necessary to throw out the equal length of the two sides of the queue, which provides an extra degree of freedom in the implementation and improves the performance.

In operation, the STWTM filter acquires a fixed length (determined by calibration) time-continuous series of acceleration samples representative and provides a filtered acceleration data sample dependent on an average acceleration magnitude of a portion of the acceleration data samples bounded within a range of amplitudes and an offset in engine crankshaft angles. Since the driveline perturbations move around in terms of order under differing engine operating conditions (engine speed, engine load, normal firing variability, etc.), the position of the filter 328 is modified using the offset. In a later block 334, a misfire condition can then be indicated dependent on a magnitude of the filtered acceleration data sample.

The misfire detector 334 generates the offset pointer (S) of the STWTM filter 328 dependent on a calibration derived for each engine family. The offset defines the starting point of the sorted data array in accordance with the expected misfire occurrence in the particular cylinder under analysis. This offset command also can be dependent on engine operating conditions, such as speed or load. This can be advantageous when used with lean-burn technologies. Optionally, other engine operating parameters can be measured and used to adjust the offset pointer (or position of the expected misfire event).

In practice, a microcontroller continuously acquires a fixed length time-continuous series of 'N' acceleration data samples using the system hardware previously introduced. The number of samples continuously acquired defines a rank, or order, of the filter 328. Different filter ranks can be used dependent on various engine operating conditions or misfire conditions to be detected. The STWTM filter is applied at every acceleration sample, and introduces a signal delay of (R-1)/2 ((rank of filter-1)/2). The basic implementation of the filter is to first sort a data set of X of rank R, from smallest to largest in magnitude using any commonly-known sorting algorithm (e.g. bubble sort, insertion, etc.) as follows $$XS=\text{sort}(X(i-R/2), X(i-R/2+1), \ldots X(i), \ldots, X(i+R/2-1), X(i+R/2))$$

Next, the mean value of 'N' number of elements (which are the number of elements about a shift from the center to average) in the sorted array is taken starting at the 'S' element (which is the number of elements to shift or offset from the center-value) in the sorted array as follows $$XSM(i)=\text{mean}(XS(S, S+1, S+2, \ldots S+N-1))$$

The filtered STWTM value at sample 'i' is then:

$$STWTM(i)=X(i)-XSM(i)$$

The STWTM filter provides significant improvement to the separation of misfire and non-misfiring data when misfire is present. When programmed with proper values the STWTM filter "pulls down" the acceleration values greater than zero during misfire cycles to accentuate the decelerations.

In operation, the STWTM filter sorts the samples similarly to prior art median filters. However, the STWTM filter provides an offset, S. Typically, a median filter will take the center value, for detection of misfires. However, misfires can cause a skewing of values, so the present invention incorporates an offset pointer to the desired median values (and not the center values as in the prior art). The amount to or set is determined empirically and is determined by the number of misfires within the rank of the filter.

In an alternative embodiment, a calibratable element in the sorted array (similar to S) is used as the subtractant in the filter calculation. The addition of the mean reduces the high frequency noise in the STWTM filter output. The filtered acceleration values (ACL_h2) are then shared between two channels. The first channel 325 is used to detect periodic (hard) misfire conditions and a second channel 329 is used to detect random misfire conditions. In particular, the second channel uses pattern cancellation 330, as is known in the art, to eliminate periodic signals so as to better detect random misfires. However, the first channel uses a novel technique of pattern matching 332 to enhance harmonic phenomena and reduce random phenomena. The pattern matching is performed in every datum base over several engine combustion cycles using an average and/or median of the acceleration values for each datum on a synchronized sample basis. This reduces random noise, non-cyclic harmonic noise, and noise at harmonics lower than one cycle.

The basic implementation of pattern matching 332 outputs a value 'Y' using pattern matching of the input vector 'X' at the 'i' element using five engine cycles by:

$$Y(i)=\text{median}(X(i-2*n), X(i-n), X(i), X(i+n), X(i+2*n));$$

Optionally, the median function can be replaced with a mean function. Utilizing the median over the mean value improves the transition into and out of misfire such that the edge effects are less, but mean values will work. Also, pattern matching can be done for any number of cycles, not just five as above. In addition, pattern matching can be extended for other uses to two or more dimensions for other applications.

Pattern matching basically breaks up data in cyclic samples which should look alike every cycle. This enhances data that repeats every 'n' samples, while reducing the amplitude of random signals of a harmonics not corresponding with 'n' samples. Typically the value for 'n' in misfire analysis would be twice the number of samples in one revolution or the number of samples in one cycle. Pattern matching enhances data that repeats every cycle (0.5 order hard misfire) and other harmonics, and reduces non-periodic signals and random signals. However, in order for this block 332 to function optimally in misfire processing, the high pass filter 328 must be used.

In an alternative embodiment, the two channels are split before the FIR 322, where further improvement would be seen in that further isolation of the orders of interest to that pattern in combination with the specific pattern matching or cancellation block can be made through selected application of the FIR filter.

In a preferred embodiment, a third channel 335 is provided to detect multiple misfires, such as two cylinders misfiring in a row or two misfires on one cylinder bank. These types of misfires provide a different acceleration signature. The acceleration block 326 can be the same as before. The non-linear high pass filter 327 can be different to accentuate the orders of interest as can the pattern matching to match those patterns of multiple misfires. Optionally, a separate FIR filter could be provided as above to further isolation of the orders of interest. In either case of the first, second or third channel, the resulting accelerations are provided to a misfire detection block 334 to determine if the filtered accelerations indicate a misfire.

In the prior art, window peak detection is used on acceleration measurements for the actual detection of misfires. A sampling window can encompass a small sample of acceleration measurements. These samples represent an angular position associated with a portion of a particular cylinder's combustion cycle that does not overlap other cylinders' firing events so that the behavior of the acquired acceleration signal is isolated to the cylinder of interest. In window peak detection, accelerations within the window are obtained and the most negative magnitude acceleration bounded within each cylinder's sampling window is compared against a threshold defining a misfire.

However, in the present invention window peak detection is not used. Instead, weighting/integrating and interpolation of acceleration samples is used for misfire detection. A novel aspect is the weighted integration of the acceleration over an arbitrary crankshaft rotational angle of any width including fractional samples.

In particular, the samples are weighted and integrated to provide an output 'y' using the weighting coefficients 'w' of the input vector 'x' at the 'i' element as follows:

$$y(i) = \sum_{j=1}^{N} w(j)x(i-j+1)$$

Higher weighting is provided to those values where misfires are most likely to occur and is determined empirically. The set of values of 'y' is then decimated to a lower rate that is not necessarily an integer factor of the sample rate of the input vector x utilizing linear interpolation. It should be recognized that other interpolation methods could also be used (e.g. nearest, spline, etc.). This operation is performed to decimate the high-data-rate signal to the firing rate signal for all channels. The advantage of interpolation gives the present invention universal application for any number of engine cylinders. In other words, any number of samples per rev can be used with any cylinder count and/or even and odd firing.

For example, with a V8 engine having with a sample rate of eighteen, and using prior art window peak detection required that samples be taken in a set of (4,5,4,5 . . . ) alternating window blocks. However; for the present invention, with a V8 engine having with a sample rate of eighteen, and using weighing and interpolation as described above, where N=5, w=(1, 1, 1, 1, 0.5), decimated, and interpolated at samples L+(0, 4.5, 9, 13.5, 18, 22.5, 27, 31.5, . . . ) where L is a phase adjustment that is calibrated to maximize the deceleration value during misfire, the misfire outputs are now evenly spaced samples at the firing rate.

The weighted, integrated, and interpolated values are then compared to an empirically determined threshold to define misfires. The particular weighting and interpolation values can be different for each channel 325, 329, 335 to accentuate the particular misfire patterns for periodic, random, and multiple misfire, respectively.

The weighting calibration of the present invention above has more meaning than window peak detection, since there is an integration of the acceleration over a crank angle window that can be matched with the work performed by the cylinder pressure on the piston. Moreover, the present invention avoids aliasing and provides a SNR that is improved an order of magnitude over the prior art through improved signal conditioning and novel ordering of the blocks.

For IC engines one of the most fundamental measures of combustion performance is the work produced by each combustion event. This value is commonly measured in the laboratory environment using in-cylinder pressure transducers to measure the gas pressure exerted on the cylinder and computing the work produced. Normalized, this value is referred to in the industry as the indicated mean effective pressure. Being a fundamental measure of the combustion there are a number of useful control and diagnostic applications for this measure; however, in production applications the use of in-cylinder pressure sensors is very expensive and there are a number of reliability concerns. For example, a measure of this value enables control on an individual cylinder basis to perform load balancing and thus improve performance and reduced noise and vibration. In addition, an estimate individual cylinder torque produced from combustion can be determined from IMEP. For example, the work done per cylinder is normally determined from $$\text{Work} = \int p \cdot dv$$

where p is the pressure integrated over the cylinder volume for one cycle. However, pressure can not be directly measured. However, the acceleration measurements of the present invention can be used to determine torque, which can then be used to calculate Work, Power and IMEP as follows.

Acceleration, torque, and piston work (Work) are related by the equations of motion. For a simple rotational system about a fixed axes this relation is:

Sum of torques=I*rotational acceleration

Where the sum of torques include output shaft torque and the torque produced from the piston work, and the rotational acceleration is simply the change in rotational velocity (determined from the acceleration sample obtained previously) over time. I is the moment of inertia about the axis of rotation. It should be recognized that the internal combustion engine is a complex system in that I is dependent upon angle, and there are many forces/torques acting on the system (e.g. friction, spring forces in the crank, etc.), but these general equations hold in that rotational accelerations are a measure of torque. For example, the present invention computes acceleration as a change in rotational velocity over a change in angle (dw/dθ), but there is only a constant difference (angular velocity, i.e., dw/dt=acceleration is w*dw/dθ) between that used in the torque calculation and a computation at constant velocity or for small changes in velocity. Therefore, the above relationship is valid in shows that acceleration is a measure of torque/work, and the signal processing in accordance with the present invention can be consider as isolating the torque or lack thereof produced by the combustion process as measured on the crankshaft.

Given the torque, Work can then be determined from

Work=4π*Sum of Torques/$N_c$ where $N_c$ is the number of cylinders of the engine. Subsequently, Power can be determined from Power=$N_c$*Work*$N$/2 where N is the engine speed. The IMEP can then be found from

IMEP=2*Power/($Vd$*$N$)

where Vd is the engine displacement. Therefore, the present invention includes determining one or more of the group of: work, power, torque, and indicated mean effective pressure (IMEP) after the accelerations are sampled. As should be realized, any of the above measurements (Work, Power, Torque, IMEP) can be used as a control variable for individual cylinder events. Many other uses for the IMEP measure are known in the art. Thus a reliable cost effective alternative as provided by the present invention is very desirable.

It is well known in the art and shown by dynamic theory of the engine system through the use of conservation of angular momentum that the work (IMEP) produced by a combustion process results in a change of rotational velocity of the crankshaft. The above discussion details on how processing of the crankshaft rotation is performed to determine misfire by the evaluation of acceleration of the crankshaft and the weighting/integration and interpolation function. The computed result produces a scaled value once per engine firing event that is compared to a threshold to determine whether misfire has occurred. This produced scaled value has removed the normal crankshaft rotational dynamics for a uniformly firing, well balanced engine. In addition, the present invention removed signals out of bandwidth of the combustion process due to high frequency torsional vibrations and other unwanted dynamics. Moreover, the present invention has removed driveline and driver disturbances. Thus leaving the crankshaft rotational signal due to cycle-to-cycle variations in the pattern cancelled channel and the repeated cyclic variations in the pattern matched channel that is an estimate of the cyclic work or IMEP. By using the scaled value of the random channel, a measure of noise vibration and harshness (NVH) due to random IMEP variations is determined, and the scaled value of the pattern matched channel indicates cyclic recurring IMEP variations. These measures (estimates of IMEP) can be used as described above and known in the art for control and diagnostics.

EXAMPLE

Tests were performed using data from a V8 engine at an engine speed of 5600 rpm, with a load=31% of full load (California Air Resources Board Line). Various misfires were introduced including hard misfires, random misfires, and multiple misfires. The acceleration data was run through a prior art median filter misfire detection algorithm versus the preferred embodiment of the present invention using two channels of misfire detection. FIG. 5 represents the relative accelerations for the prior art technique. FIG. 6 represents the relative accelerations in accordance with the present invention. The same representative data was used in both figures. In particular, a period of normal operation 500 with no misfire was presented followed by a period 502 where hard misfires for each of the eight cylinders were introduced. This is followed by a period 504 where random misfires were introduced. This is followed by a period 506 where multiple misfires (periodic paired cylinder misfire) were introduced.

As can be seen, although the overall signal level was less with the present invention (FIG. 6) the SNR was much greater, which enhances misfire detection. For example a threshold of −0.3 essentially detects all misfires, with a threshold of −0.5 being quite usable, also. In addition, the prior art (FIG. 5) had some trouble discriminating misfires between cylinders where some cylinder misfires were close to the noise, whereas the present invention had no such trouble. Of further interest, the present invention was able to discriminate multiple misfires, whereas in the prior art these misfires are buried in noise and are undetectable.

In summary, by applying the above-described approach a significant improvement in the fidelity (as measured in terms of both separation factor and signal-noise ratio) of the signal representative of the engine acceleration can be achieved. This includes improving signal fidelity over a wide dynamic range according to engine and driveline related variable magnitude, duration, and frequency vibrations. Because of this improvement, engine misfires can be detected over a much broader range of vehicular operating conditions than prior art systems, including detection of hard misfires, random misfires, and multiple misfires.

Moreover, the present invention can find application for other than misfire detection, such as to track or remove disturbances caused by skewed non-normal distribution. Further, pattern cancellation and pattern matching can be used to simultaneously determine cyclic random and cyclic harmonic information from non-cyclic noise.

While specific components and functions of the present invention are described above, fewer or additional functions could be employed by one skilled in the art and be within the broad scope of the present invention. The invention should be limited only by the appended claims.

What is claimed is:

1. A method for detecting misfires of cylinders of a reciprocating internal combustion engine, the method comprising the steps of:
   predefining an fueled acceleration profile for a normal operation of the engine;
   acquiring a series of acceleration data representative of acceleration behavior of the reciprocating engine using a central difference algorithm;
   sampling the data to obtain acceleration data samples at a rate sufficient to obtain up to fourth-order perturbations of the acceleration data;
   correcting the samples using the fueled acceleration profile;
   filtering the samples to provide bandwidth limited samples;
   providing the samples to at least two channels;
   pattern matching the samples in the first channel to enhance harmonic phenomena and reduce random phenomena;
   pattern canceling the samples in the second channel to enhance random phenomena and reduce harmonic phenomena; and
   detecting misfires dependent on a magnitude of the filtered acceleration data samples.

2. A method in accordance with claim 1, wherein the step of predefining a fueled acceleration profile includes adapting the fueled acceleration profile as a function of speed and load.

3. A method in accordance with claim 1 further comprising a second filtering step for each channel, wherein the second filtering step includes highpass filtering the samples nonlinearly to reduce signals less than order 0.5.

4. A method in accordance with claim 1, wherein the acquiring step includes calculating acceleration from velocity information using the central difference algorithm that takes a difference between an earlier velocity sample and a later velocity sample, wherein an $i^{th}$ acceleration sample is determined from velocity sample as follows $$acceleration_i = v_{i+1} - v_{i-1}$$

such that the acceleration is a function of the change in velocity with phase.

5. A method in accordance with claim 1, further comprising the step of weighting and integrating the acceleration samples over an arbitrary crankshaft rotational angle of any width including fractional samples.

6. A method in accordance with claim 5, including a substep of decimating the samples to a lower rate that is not necessarily an integer factor of the sample rate utilizing linear interpolation.

7. A method in accordance with claim 1, wherein the detecting step includes shifting time-weighted trimmed-median acceleration samples from a sorted center value to one of an average and median value dependent upon detected misfires.

8. A method in accordance with claim 1, wherein the providing step includes providing three channels and the pattern matching step includes pattern matching cyclically sampled data to enhance detection of hard misfires in the first channel an using different pattern matching for sampled data to enhance detection of multiple misfires in the third channel.

9. A method in accordance with claim 2, wherein the fueled acceleration profile is bandwidth limited to reduce DC signals and signals with an order greater than second order.

10. A method in accordance with claim 1, wherein the sampling step includes determining one or more of the group of: work, power, torque, and indicated mean effective pressure (IMEP).

11. A method for detecting misfires of cylinders of a reciprocating internal combustion engine, the method comprising the steps of:

predefining a fueled acceleration profile for a normal operation of the engine and a non-fueled correction profile;

acquiring a series of acceleration data representative of acceleration behavior of the
reciprocating engine using a central difference algorithm at each sample that takes a
difference between an earlier velocity sample and a later velocity sample;

oversampling the data to obtain acceleration data samples at a rate sufficient to obtain up to fourth-order perturbations of the acceleration data;

adapting the fueled acceleration profile as a function of speed and load;

correcting the samples using the fueled correction profile and the non-fueled correction profile;

filtering the samples with a variable order finite-impulse response to provide bandwidth limited samples;

providing the sales to at least two channels;

highpass filtering the samples non-linearly in each channel;

pattern matching the samples in the first channel to enhance harmonic phenomena and reduces random phenomena for detecting hard misfires;

pattern canceling the samples in the second channel to enhance random phenomena and reduces harmonic phenomena for detecting random misfires; and detecting misfires dependent on a magnitude of the filtered acceleration data samples.

12. A method in accordance with claim 11, wherein the second filtering step filters each a to reduce signal less than order 0.5.

13. A method in accordance with claim 11, the reducing step includes calculating acceleration from velocity information using the central difference algorithm at each sample to takes a difference between an earlier velocity sample and a later velocity sample, wherein an $i^{th}$ acceleration sample is determined from velocity samples as follows $$acceleration_1 v_{i+1} - v_{1-1}$$

such that the acceleration is a function of the change in velocity with respect to phase.

14. A method in accordance with claim 11, further comprising the step of weighting and integrating the acceleration samples over an arbitrary crankshaft rotational angle of any width including fractional samples and decimating the samples to a lower rate that is not necessarily an integer factor of the sample rate utilizing linear interpolation.

15. A method in accordance with claim 11, wherein the detecting step includes shifting time-weighted trimmed-median acceleration samples from a sorted center value to one of an average and median value dependent upon detected misfires.

16. A method in accordance with claim 11, wherein the providing step includes providing three channels and the pattern matching step includes pattern matching cyclically sampled data to enhance detection of multiple misfires in the third channel.

17. A misfire detection system for a reciprocating internal combustion engine, the system comprising:

acceleration measurement means for acquiring a series of acceleration data representative of acceleration behavior of the reciprocating engine using a central difference algorithm;

means for sampling the data to obtain acceleration data samples at a rate sufficient to obtain up to fourth-order perturbations of the acceleration data;

means for filtering the samples to provide bandwidth limited samples;

means for pattern matching the samples to enhance harmonic phenomena over random phenomena;

means for pattern canceling the samples in the second channel to enhance random phenomena over harmonic phenomena; and means for detecting misfires dependent on a magnitude of the filtered acceleration data samples.

18. A system in accordance with claim 17, further comprising means for weighting and integrating the acceleration samples over an arbitrary crankshaft rotational angle of any width including fractional samples.

19. A system in accordance with claim 18, including means for decimating the samples to a lower rate that is not necessarily an integer factor of the sample rate utilizing linear interpolation.

20. A system in accordance with claim 17 wherein the means for detecting include means for shifting time-weighted trimmed-median acceleration samples from a sorted center value to one of an average and median value dependent upon detected misfires.

21. A system in accordance with claim 17, wherein the means for path matching include a separate pattern matching for the sampled data to enhance detection of multiple misfires.

22. A system in accordance with claim 17, wherein the means for sampling included determining one or more of the group of: work, power, torque, and indicated mean effective pressure (IMEP).

* * * * *